(12) United States Patent
Swann

(10) Patent No.: US 9,259,683 B2
(45) Date of Patent: Feb. 16, 2016

(54) METHODS AND APPARATUS FOR TREATING FLUORINATED GREENHOUSE GASES IN GAS STREAMS

(71) Applicant: Micron Technology, Inc., Boise, ID (US)

(72) Inventor: Leslie Swann, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 116 days.

(21) Appl. No.: 14/161,470

(22) Filed: Jan. 22, 2014

(65) Prior Publication Data

US 2015/0202566 A1 Jul. 23, 2015

(51) Int. Cl.
*B01D 53/68* (2006.01)
*B01D 53/70* (2006.01)
*B01D 53/74* (2006.01)

(52) U.S. Cl.
CPC ..................................... *B01D 53/68* (2013.01)

(58) Field of Classification Search
CPC ...... B01D 53/68; B01D 53/685; B01D 53/70; B01D 53/74
USPC .......................................... 423/240 R, 240 S
See application file for complete search history.

(56) References Cited

U.S. PATENT DOCUMENTS

| | | | |
|---|---|---|---|
| 4,515,762 A * | 5/1985 | Griesshammer et al. ..... 423/337 |
| 5,716,428 A | 2/1998 | Imamura | |
| 5,938,422 A | 8/1999 | Smith et al. | |
| 5,961,695 A * | 10/1999 | Hasegawa et al. ............... 95/230 |
| 6,090,183 A | 7/2000 | Awaji | |
| 6,126,906 A | 10/2000 | Imamura | |
| 6,423,284 B1 | 7/2002 | Arno et al. | |
| 6,432,372 B2 * | 8/2002 | Schumacher ................. 423/210 |
| 6,790,421 B2 | 9/2004 | Mori | |
| 6,800,255 B2 | 10/2004 | Brady et al. | |
| 7,128,882 B2 | 10/2006 | Tamata et al. | |
| 7,214,349 B2 | 5/2007 | Holst et al. | |
| 7,347,980 B2 | 3/2008 | Kanno et al. | |
| 7,494,633 B2 | 2/2009 | Stanton et al. | |
| 2002/0111526 A1 | 8/2002 | Seeley | |
| 2004/0241069 A1 | 12/2004 | Kokun et al. | |
| 2011/0023908 A1 | 2/2011 | Neuber et al. | |

FOREIGN PATENT DOCUMENTS

| | | | | |
|---|---|---|---|---|
| FR | 2955786 A1 * | 8/2011 | ............. | B01D 53/02 |
| GB | 2353034 A * | 2/2001 | ............. | B01D 53/68 |
| WO | 0035573 A1 | 6/2000 | | |

* cited by examiner

*Primary Examiner* — Timothy Vanoy
(74) *Attorney, Agent, or Firm* — TraskBritt

(57) ABSTRACT

A method for removing fluorinated greenhouse gas from a gas stream comprises reacting at least one fluorinated greenhouse gas in a gas stream with at least one of a silane-based and a borane-based compound to provide an abated gas stream. An apparatus for removing fluorinated greenhouse gases from a gas stream comprises a fluorinated gas decomposer unit configured to decompose fluorinated greenhouse gases in a gas stream. The apparatus further comprises a silane-based or a borane-based compound introduction unit configured to introduce at least one of a silane-based and a borane-based compound into the fluorinated gas decomposer unit.

26 Claims, 1 Drawing Sheet

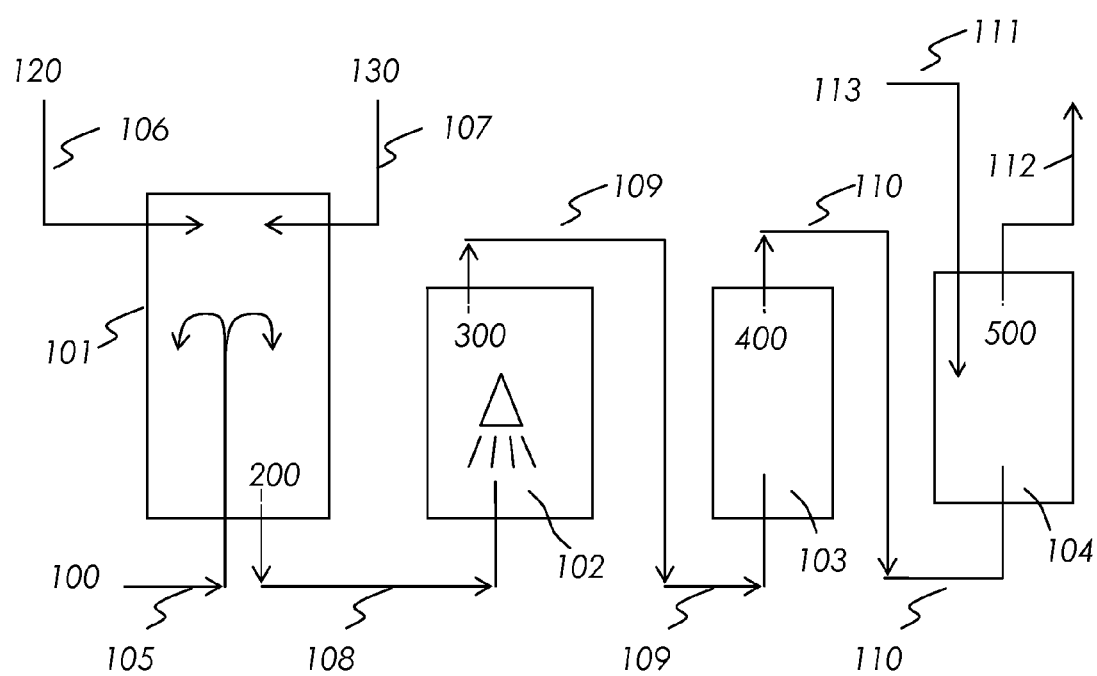

METHODS AND APPARATUS FOR TREATING FLUORINATED GREENHOUSE GASES IN GAS STREAMS

FIELD

The present disclosure, in various embodiments, relates generally to methods and apparatus for treating fluorinated greenhouse gases in gas streams. More particularly, the present disclosure relates to methods and apparatus for treating fluorinated greenhouse gases produced during semiconductor fabrication, including photovoltaic, display, MEMS, nanotechnology, and related device manufacturing.

BACKGROUND

Fluorinated greenhouse gases, carbon dioxide, methane, and nitrous oxide are collectively known as greenhouse gases, since they are capable of absorbing and holding heat in the atmosphere, thus contributing to a phenomenon known as global warming effect. Each of these gases is controlled by the Kyoto Protocol, which is a global environmental agreement. Fluorinated greenhouse gases are further controlled by specific European legislation.

Fluorinated greenhouse gases (F-GHG gases) are a group of fluorine-containing gases that have long atmospheric lifetimes and that trap heat in the atmosphere, including perfluorocarbons (PFCs), hydrofluorocarbons (HFCs), sulfur hexafluoride ($SF_6$), and nitrogen trifluoride ($NF_3$). Of all the greenhouse gases, fluorinated greenhouse gases are the most powerful and persistent greenhouse gases. Fluorinated greenhouse gases have very stable C—F bonds and, therefore, they are chemically very stable. Thus, they remain unchanged and stay for a long period of time if they are released to an ambient atmosphere. It is reported that the projected life span until consumption in the atmosphere for $CF_4$ is 50,000 years, and for $C_2F_6$ is 10,000 years. Further, F-GHGs have high global warming potentials (GWP), which is a measure of the total energy that a gas absorbs over a particular time period. For example, it is reported that the global warming potential (relative to $CO_2$) is 5,210 in the case of $CF_4$ and 8,630 in the case of $C_2F_6$ (over a 20 year period).

Many industrial gas streams, such as exhaust gas streams produced by the manufacturers of semiconductor materials and devices contain a wide variety of chemical species. These chemical species must be removed from the gas streams before being discharged from manufacturing facilities into the atmosphere. Fluorinated greenhouse gases (F-GHG gases) are used during the manufacture of semiconductor materials and devices. For example, F-GHG gases, such as $CF_4$, $C_2F_6$ and $NF_3$, are used as cleaning gases to remove accumulated films, such as $SiO_2$, from the surfaces of a chemical vapor deposition (CVD) chambers. F-GHG gases, such as CF4, C2F6, $C_3F_8$, $C_4H_8$, $CHF_3$, $SF_6$ and $NF_3$, are used as etchants in dry etch processes. Furthermore, F-GHG gases are used in the production of DRAM, NAND and other semiconductor devices, including photovoltaic, display, MEMS, nanotechnology, and related device manufacturing.

Conventional methods of abating fluorinated greenhouse gases in a gas stream rely on a thermal combustion or decomposition of the fluorinated greenhouse gases, which methods typically takes place at a temperature of at least 1400° C. Thus, the conventional methods of treating fluorinated greenhouse gases in gas streams demand large amounts of energy.

Accordingly, there have been extensive efforts to develop methods and abatement systems for treating fluorinated greenhouse gases in gas streams that require lower amounts of energy.

U.S. Pat. No. 5,938,422 discloses a process for thermally destructing perfluorinated gases in an exhaust gas stream, wherein air/oxygen is added to a mixture of fuel gas and the exhaust gas stream prior to subjecting the mixture to combustion.

U.S. Pat. No. 6,126,906 discloses a method to remove perfluorinated gas from a semiconductor exhaust gas by thermally decomposing perfluorinated gas in the exhaust gas in a presence of saturated or unsaturated hydrocarbon gas, at a temperature of 600° C. or more under non-oxidative conditions (i.e., in the absence of separated oxygen gas).

U.S. Pat. No. 6,790,421 discloses a method of treating an exhaust gas by thermally decomposing fluorine-containing compound in the exhaust gas in a presence of γ-alumina catalyst and at least one decomposition-assisting gas selected from hydrogen gas, oxygen gas, and water vapor.

U.S. Pat. No. 7,347,980 discloses a process for treating fluorine-containing gases by contacting fluorine compound-containing gases with a catalyst in a presence of steam. The fluorine-containing gases are hydrolyzed to produce hydrogen fluoride (HF) gases. The use of catalyst allows the hydrolysis to take place at a temperature of from 400° C. to 800° C., which is much lower than the typical temperature of at least 1400° C. without the catalyst. The catalyst may be alumina, titania, zirconia and silica.

BRIEF DESCRIPTION OF THE DRAWING

FIG. 1 is a schematic view illustrating a method for treating fluorinated greenhouse gases in a gas stream according to some embodiments of the present disclosure.

DETAILED DESCRIPTION

The following description provides specific details, such as chemical species, chemical reactions, and reaction conditions, in order to provide a thorough description of embodiments of the disclosure. However, a person of ordinary skill in the art will understand that embodiments of the present disclosure may be practiced without employing these specific details. Indeed, the embodiments of the present disclosure may be practiced in conjunction with conventional techniques employed in the industry.

In addition, the description provided herein does not form a complete process for treating fluorinated greenhouse gases in a gas stream, such as, for example, an exhaust gas stream. Only those process acts necessary to understand the embodiments of the present disclosure are described in detail below. Additional acts to treat a gas stream may be performed by conventional processes and techniques. Also, the drawing accompanying the application is for illustrative purposes only, and is thus not necessarily drawn to scale.

As used herein, the term "fluorinated greenhouse gas" or "F-GHG gas" means and includes a fluorine-containing gas that is capable of trapping heat in the atmosphere, and thus contributing to global warming effect. Non-limiting examples may include, but are not limited to, perfluorocarbons (PFCs), hydrofluorocarbons (HFCs), sulfur hexafluoride ($SF_6$), or nitrogen trifluoride ($NF_3$).

In one embodiment, a method of treating fluorinated greenhouse gases in a gas stream may comprise contacting the gas stream with a silane-based compound to provide an abated gas stream that comprises silicon tetrafluoride ($SiF_4$), hydrofluoric acid (HF), and byproducts.

The silane-based compound may be a gas at room temperature and ambient pressure. Non-limiting examples of suitable silane-based compounds may include, but are not limited to, silane ($SiH_4$), disilane, trisilane, or other higher orders of silanes. In one particular embodiment, the silane-based compound is silane ($SiH_4$). The silane-based compound may also include structural variations of silanes or polysilanes including, but not limited to, chlorosilanes, aminosilanes, organosilanes, or combinations thereof.

By way of non-limiting example, the fluorinated greenhouse gases present in a gas stream, which may also be characterized as a process gas stream and more specifically, in some instances a gas stream, may include a compound consisting of carbon and fluorine; a compound consisting of carbon, hydrogen and fluorine; a compound consisting of sulfur and fluorine; a compound consisting of nitrogen and fluorine; or a compound consisting of carbon, hydrogen, oxygen and fluorine. Non-limiting examples of these compounds may include, but are not limited to, $CF_4$, $C_2F_6$, $C_3F_8$, $C_4H_8$, $C_5F_8$, $CHF_3$, $CH_2F_2$, $CH_3F$, $C_2HF_5$, $C_2H_2F_4$, $C_2H_3F_3$, $C_2H_4F_2$, $C_2H_5F$, $CH_2OCF_2$, $SF_6$ or $NF_3$.

FIG. 1 is a schematic view illustrating a method of treating a gas stream according to one embodiment of the present disclosure. A gas steam comprising at least one fluorinated greenhouse gas 100 may be sent through a conduit 105 to a fluorinated gas decomposer unit 101. A silane-based compound 120 may be introduced through a conduit 106 to the fluorinated gas decomposer unit 101. The silane-based compound 120 may be generated as a byproduct of another semiconductor process and, thus, may be recycled and reused from other semiconductor process for use in removing the fluorinated greenhouse gas from the gas stream. The silane-based compound 130 may also be provided from a gas source, such as a gas cylinder, and introduced through a conduit 107 to the fluorinated gas decomposer unit 101. Alternatively, the silane-based compound 130 from the gas source may be used in combination with the silane-based compound 120 generated from the other semiconductor process to supplement the amount of silane-based compound needed. The at least one fluorinated greenhouse gas 100 and the silane-based compound (120, 130) may be then contacted in the fluorinated gas decomposer unit 101.

Upon contact, the silane-based compound (120, 130) and at least one fluorinated greenhouse gas 100 may react with one another to provide an abated gas stream 200 that comprises silicon tetrafluoride ($SiF_4$), hydrofluoric acid (HF), and byproducts. Equations (1) to (5) show non-limiting examples of chemical reactions that may take place between the fluorinated greenhouse gas 100 in the gas stream and the silane-based compound (120, 130).

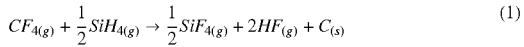  (1)

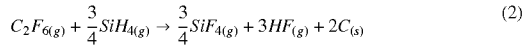  (2)

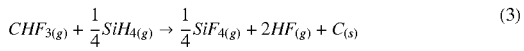  (3)

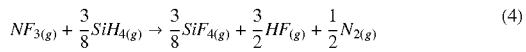  (4)

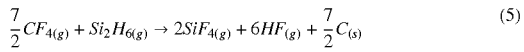  (5)

Accordingly, a method of removing fluorinated greenhouse gases from a gas stream comprises reacting at least one fluorinated greenhouse gas in a gas stream with a silane-based compound to produce an abated gas stream comprising silicon tetrafluoride ($SiF_4$). The silane-based compound is selected from the group consisting of silane ($SiH_4$), disilane, trisilane, a higher order of silane, and some structural variation of silanes or polysilanes.

The reaction between the fluorinated greenhouse gas in the gas stream and the silane-based compound may take place spontaneously or may require an external energy source, such as an ignition source, to initiate the reaction. If present, the ignition source may be located inside or outside of the fluorinated gas decomposer unit 101. Non-limiting examples of the ignition source include, but are not limited to, a low level pilot light or an article having a spark plug, such as a tungsten spark plug.

Thus, the disclosed methods of removing fluorinated greenhouse gas in the gas stream require substantially lower amounts of energy, compared to conventional methods that rely on thermal combustion of fluorinated greenhouse gas at a temperature of at least 400° C. Furthermore, the disclosed methods chemically reduce the fluorinated greenhouse gas in the gas stream using the silane-based compound as a reducing agent. In contrast, the conventional methods involve oxidative combustion of the fluorinated greenhouse gas.

The silane-based compound (120, 130) may be introduced into the fluorinated gas decomposer unit 101 at a predetermined flow rate, such that the molar amounts of silane-based compound are less than the molar amounts of the fluorinated greenhouse gas in the gas stream. In one embodiment, the flow rate of the silane-based compound may be hundreds of standard cubic centimeters per minute (sccm). In one embodiment, the flow rate of the silane-based compound may be from about 100 sccm to about 300 sccm. One of ordinary skill in the art may readily determine and adjust the flow rate of the silane-based compound to provide the correct molar amount relative to that of the fluorinated greenhouse gas. Furthermore, the flow rate of silane-based compound may be increased to reduce the reaction temperature of the fluorinated greenhouse gas and silane-based compound.

Referring again to FIG. 1, the abated gas stream 200 comprising silicon tetrafluoride ($SiF_4$), HF and byproducts may be discharged from the fluorinated gas decomposer unit 101 through a conduit 108, and sent to a scrubbing unit 102. While $SiF_4$ and HF are not greenhouse gases, they are conventionally viewed as pollutants and, thus, may be removed from the abated gas stream 200. Any conventional scrubbing techniques may be used in the scrubbing unit 102 to decompose $SiF_4$ and HF in the abated gas steam 200.

In one embodiment of present disclosure, the scrubbing unit 102 may include a wet scrubbing unit. Upon subjecting the abated gas stream 200 to the wet scrubbing process, the silicon tetrafluoride ($SiF_4$) and hydrogen fluoride (HF) in the abated gas stream 200 may be absorbed and reacted as shown in equations (6), (7a) and (7b) to remove the $SiF_4$ and HF from the abated gas stream 200.

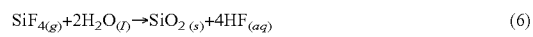  (6)

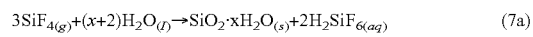  (7a)

  (7b)

The processed gas stream 300 comprising silicon dioxide and the fluorine-containing acid may be discharged from the scrubbing unit 102 through a conduit 109, and sent to a scrubbing unit 103. Any conventional scrubbing techniques may be in the scrubbing unit 103 to remove the fluorine-containing acid (e.g., HF, $H_2SiF_6$) from the processed gas stream 300.

In one embodiment, the scrubbing unit 103 may include an acid scrubbing unit. The fluorine-containing acid (e.g., HF, $H_2SiF_6$) in the processed gas stream 300 may be neutralized and removed from the processed gas stream 300 using any conventional acid scrubbing processes. Alternatively, the HF may be converted to a fluoride salt. Additionally, the function and operation of scrubbing unit 103 may also be performed within the scrubbing unit 102.

In some embodiments, upon introducing the processed gas stream 300 comprising fluorine-containing acid (e.g., HF, $H_2SiF_6$) to the scrubbing unit 103, the processed gas stream 300 may be treated with an alkaline solution to neutralize and remove the fluorine-containing acid from the processed gas stream 300. The processed gas stream 300 may be sprayed with an alkaline solution, or may be bubbled through the alkaline solution, so that the neutralized fluorine-containing acid may be dissolved into the aqueous solution. Then, the resulting aqueous solution may be sent for further processing such as wastewater treatment. Any conventional alkaline washing solution may be used. Non-limiting examples of the alkaline washing solution may include a solution of NaOH, $Ca(OH)_2$, $Mg(OH)_2$, or a $CaCO_3$ salt. In one embodiment, the acid scrubbing process may be performed at a pH of from about 8 to about 9. Furthermore, the pH of acid scrubbing process may be adjusted in accordance with the types of generated fluorine-containing acids.

In some embodiments, upon introducing the processed gas stream 300 comprising fluorine-containing acid to the scrubbing unit 103, the processed gas stream 300 may be passed through an absorbent medium that is loaded with solid fillers configured to react with the fluorine-containing acid. Non-limiting examples of the solid fillers may include, but are not limited to, CaO, $CaCO_3$, or a mixture thereof. The solid fillers may adsorb and remove the fluorine-containing acid from the processed gas stream 300 in the form of solid $CaF_2$, as shown in equations (8) and (9):

$$CaO_{(s)} + 2HF_{(g)} \rightarrow CaF_{2(s)} + H_2O \qquad (8)$$

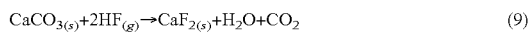

$$CaCO_{3(s)} + 2HF_{(g)} \rightarrow CaF_{2(s)} + H_2O + CO_2 \qquad (9)$$

Accordingly, a method of removing fluorinated greenhouse gases from a gas stream comprises contacting a gas stream comprising at least one fluorinated greenhouse gas with a silane-based compound to provide an abated gas stream, wherein the abated gas stream comprises silicon tetrafluoride ($SiF_4$) and hydrofluoric acid (HF). The method further comprises removing the silicon tetrafluoride and removing the hydrofluoric acid.

Referring again to FIG. 1, a treated gas stream 400 may be discharged from the scrubbing unit 103 through a conduit 110. Optionally, the treated gas stream 400 in the conduit 110 may be sent to a byproduct processing unit 104 to remove any byproducts or other noxious gases in the gas stream, prior to releasing the treated gas stream 400 to the atmosphere through a conduit 112. Any conventional processing techniques may be used depending on the physical and chemical characteristics of the byproducts or other noxious gases in the gas stream.

By way of non-limiting example, where the byproducts are composed of the carbon byproducts generated from the chemical reactions shown in equations (1)-(3) and (5) and/or silicon dioxide ($SiO_2$) fine solid particles generated from the chemical reaction shown in equations (6) and (7), a byproduct processing unit 104 may include a filter, a water spraying unit, or other particulate removal units to remove carbon and/or $SiO_2$ byproducts from the treated gas stream 400 to provide a gas steam 500. The gas stream 500 then may be discharged into the atmosphere through the conduit 112 or to other processing units.

As a further non-limiting example, the byproduct processing unit 104 may include a combustion unit to thermally decompose the byproducts or other noxious gases in the gas stream, prior to releasing the treated gas stream 400 to the atmosphere through a conduit 112. In such embodiment, the treated gas stream 400 may be mixed with external air 113 introduced to the byproduct processing unit 104 via a conduit 111 to combust any flammable compounds in the treated gas stream 400. The thermal decomposition may convert the flammable compounds in the treated gas stream 400 to $CO_2$ and $H_2O$, providing a gas stream 500 that may be discharged into the atmosphere through the conduit 112 or to other processing units.

Although FIG. 1 shows that the scrubbing unit 103 for treatment of fluorine-containing acid is downstream from the scrubbing unit 102 for treatment of $SiF_4$, and that the byproduct processing unit 104 is downstream from the scrubbing units 102 and 103, one of ordinary skill in the art understands that the relative positions of the byproduct processing unit 104 and the scrubbing units 102 and 103 may be reversed, combined, or may be in any sequential order as appropriate.

Accordingly, an apparatus for removing fluorinated greenhouse gases from a gas stream comprises a fluorinated gas decomposer unit configured to decompose fluorinated greenhouse gases in a gas stream and provide an abated gas stream comprising silicon tetrafluoride ($SiF_4$) and hydrofluoric acid (HF). The apparatus further comprises a silane-based or a borane-based compound introduction unit configured to introduce at least one of a silane-based compound and a borane-based compound into the fluorinated gas decomposer unit.

In one further embodiment, a method of treating fluorinated greenhouse gases in a gas stream may comprise contacting the gas stream with a borane-based compound.

Accordingly, a method of removing fluorinated greenhouse gases from a gas stream comprises treating a gas stream of a semiconductor manufacturing facility with a silane-based or a borane-based compound to reduce an amount of fluorinated greenhouse gases in the gas stream.

The disclosed method of removing fluorinated greenhouse gases from a gas stream may be used to treat various gas streams. Non-limiting examples may include, but are not limited to, gas streams generated from refrigeration and air-conditioning systems, fire protection systems, high voltage switchgear, aerosols, metered dose inhalers, semiconductor production, and foam production.

The reaction between the fluorinated greenhouse gases in a gas stream and the silane-based or borane-based compound may take place spontaneously or may require the input of minimum energy, such as ignition energy, to initiate the reaction. Thus, the disclosed methods for treating the fluorinated greenhouse gases in a gas stream utilize lower amounts of energy, compared to the conventional methods that rely on thermal combustion of the fluorinated greenhouse gases at a temperature of at least 400° C. The reaction of the fluorinated greenhouse gases and the silane-based or borane-based compound is exothermic and is thermodynamically driven by the stability of the stable Si—F bonds formed in $SiF_4$ or B—F bonds formed in $BF_3$.

Accordingly, a method of removing fluorinated greenhouse gases from a process gas comprises employing a process gas comprising at least one fluorinated greenhouse gas in a process act in a manufacturing facility, and treating the process gas with at least one of a silane-based and borane-based compound to provide an abated gas comprising a reduced amount of the at least one fluorinated greenhouse gas. The method further comprises releasing the abated gas from the manufacturing facility.

While the present disclosure is susceptible to various modifications and alternative forms, specific embodiments have been shown by way of example in the drawings and have been described in detail herein. However, the present disclosure is not intended to be limited to the particular forms disclosed. Rather, the present disclosure encompasses all modifications, equivalents, and alternatives falling within the scope of the present disclosure as defined by the following appended claims and their legal equivalents.

What is claimed is:

1. A method of removing fluorinated greenhouse gases from a gas stream, the method comprising:
contacting a gas stream comprising at least one fluorinated greenhouse gas with a silane-based compound to spontaneously react the at least one fluorinated greenhouse gas and the silane-based compound, the reaction providing an abated gas stream comprising silicon tetrafluoride ($SiF_4$) and hydrofluoric acid (HF);
removing the silicon tetrafluoride; and
removing the hydrofluoric acid.

2. The method of claim 1, wherein contacting a gas stream comprising at least one fluorinated greenhouse gas with a silane-based compound comprises:
contacting the gas stream with a silane-based compound selected from the group consisting of silane ($SiH_4$), disilane, trisilane, a higher order of silane, a structural variation of silane or polysilane, chlorosilane, aminosilane, organosilane, and combinations thereof.

3. The method of claim 1, wherein the at least one fluorinated greenhouse gas comprises at least one of:
a compound consisting of carbon and fluorine;
a compound consisting of carbon, hydrogen and fluorine;
a compound of sulfur and fluorine;
a compound consisting of nitrogen and fluorine; and
a compound consisting of carbon, hydrogen, oxygen and fluorine.

4. The method of claim 1, wherein removing the silicon tetrafluoride comprises hydrolyzing the silicon tetrafluoride to produce silicon dioxide and a fluorine-containing acid.

5. The method of claim 4, further comprising subjecting the fluorine-containing acid to an acidic scrubbing process.

6. The method of claim 1, wherein removing the hydrofluoric acid comprises exposing the hydrofluoric acid to acidic scrubbing.

7. The method of claim 6, wherein exposing the hydrofluoric acid to an acidic scrubbing process comprises exposing the abated gas stream to an alkaline solution.

8. A method of removing fluorinated greenhouse gases from a gas stream, the method comprising:
reacting at least one fluorinated greenhouse gas in a gas stream with a silane-based compound spontaneously or with an ignition source to initiate the reaction produce an abated gas stream comprising silicon tetrafluoride ($SiF_4$),
wherein the silane-based compound is selected from the group consisting of silane ($SiH_4$), disilane, trisilane, a higher order of silane, a structural variation of silane or polysilane, chlorosilane, aminosilane, organosilane, and combinations thereof.

9. The method of claim 8, further comprising hydrolyzing the silicon tetrafluoride in the abated gas stream.

10. The method of claim 8, wherein reacting at least one fluorinated greenhouse gas in a gas stream with a silane-based compound comprises initiating a reaction between the at least one fluorinated greenhouse gas and the silane-based compound with an external energy source.

11. A method of removing fluorinated greenhouse gases from a gas stream, the method comprising:
treating a gas stream of a semiconductor manufacturing facility with at least one of a silane-based and a borane-based compound in the presence of an ignition source to reduce an amount of fluorinated greenhouse gases in the gas stream.

12. The method of claim 11, wherein treating a gas stream of a semiconductor manufacturing facility with at least one of a silane-based and a borane-based compound comprises:
treating the gas stream comprising a gas selected from the group consisting of $CF_4$, $C_2F_6$, $C_3F_8$, $C_4H_8$, $C_5F_8$, $CHF_3$, $CH_2F_2$, $CH_3F$, $C_2HF_5$, $C_2H_2F_4$, $C_2H_3F_3$, $C_2H_4F_2$, $C_2H_5F$, $CH_2OCF_2$, $SF_6$ and $NF_3$ with the silane-based compound or the borane-based compound.

13. The method of claim 11, wherein treating a gas stream of a semiconductor manufacturing facility with at least one of a silane-based and a borane-based compound comprises:
generating at least one of the silane-based compound and the borane-based compound from a semiconductor fabrication process exhaust.

14. The method of claim 11, wherein treating a gas stream of a semiconductor manufacturing facility with at least one of a silane-based and a borane-based compound comprises:
producing an abated gas stream comprising hydrofluoric acid (HF), at least one byproduct, and at least one of silicon tetrafluoride ($SiF_4$) and boron trifluoride ($BF_3$).

15. The method of claim 14, further comprising exposing the abated gas stream to an alkaline solution to neutralize the hydrofluoric acid.

16. The method of claim 14, further comprising exposing the abated gas stream to water to produce a fluorine-containing acid, and at least one of silicon dioxide and boron trioxide.

17. The method of claim 16, further comprising exposing the fluorine-containing acid to an alkaline solution to neutralize the fluorine-containing acid.

18. The method of claim 14, further comprising thermally decomposing the at least one byproduct.

19. A method of removing fluorinated greenhouse gases from a process gas, the method comprising:
employing a process gas comprising at least one fluorinated greenhouse gas in a process act in a manufacturing facility;
reacting the process gas with at least one of a silane-based compound and a borane-based compound to provide an abated gas comprising a reduced amount of the at least one fluorinated greenhouse gas, wherein the reaction is spontaneous or uses an ignition source to initiate the reaction; and
releasing the abated gas from the manufacturing facility.

20. The method of claim 19, further comprising acidic scrubbing the abated gas stream prior to releasing the abated gas stream from the manufacturing facility.

21. The method of claim 19, further comprising thermally decomposing the abated gas stream prior to releasing the abated gas stream from the manufacturing facility.

22. An apparatus for removing fluorinated greenhouse gases from a gas stream, the system comprising:
a fluorinated gas decomposer unit configured to decompose fluorinated greenhouse gases in a gas stream and provide an abated gas stream comprising hydrofluoric acid (HF) and at least one of silicon tetrafluoride ($SiF_4$) and boron trifluoride ($BF_3$);
a silane-based or borane-based compound introduction unit configured to introduce at least one of a silane-based compound and a borane-based compound into the fluorinated gas decomposer unit; and
an ignition source configured to initiate the decomposition of the fluorinated greenhouse gases in the gas stream.

23. The apparatus of claim 22, wherein the ignition source comprises at least one of a low level pilot light and an article comprising a spark plug, and wherein the ignition source is located inside or outside of the fluorinated gas decomposer unit.

24. The apparatus of claim 22, further comprising a scrubbing unit downstream of the fluorinated gas decomposer unit, the scrubbing unit configured to hydrolyze at least one of the silicon tetrafluoride and the boron trifluoride in the abated gas stream.

25. The apparatus of claim 22, further comprising an acid scrubbing unit downstream of the fluorinated gas decomposer unit, the acid scrubbing unit configured to remove the hydrofluoric acid in the abated gas stream.

26. The apparatus of claim 22, further comprising a combustion unit downstream of the fluorinated gas decomposer unit.

* * * * *

UNITED STATES PATENT AND TRADEMARK OFFICE
CERTIFICATE OF CORRECTION

| | |
|---|---|
| PATENT NO. | : 9,259,683 B2 |
| APPLICATION NO. | : 14/161470 |
| DATED | : February 16, 2016 |
| INVENTOR(S) | : Leslie Swann |

It is certified that error appears in the above-identified patent and that said Letters Patent is hereby corrected as shown below:

In the specification:

COLUMN 1, LINE 36, change "warning potentials (GWP)," to --warming potentials (GWPs),--

In the claims:

CLAIM 8, COLUMN 7, LINE 51, change "reaction produce" to --reaction to produce--

Signed and Sealed this
Tenth Day of May, 2016

Michelle K. Lee
*Director of the United States Patent and Trademark Office*